United States Patent [19]
Chang et al.

[11] Patent Number: 5,164,167
[45] Date of Patent: Nov. 17, 1992

[54] PROCESS FOR THE REMOVAL OF ACID FORMING GASES FROM EXHAUST GASES

[75] Inventors: Shih-Ger Chang, El Cerrito; David K. Liu, San Pablo, both of Calif.

[73] Assignee: Regents of the University of California, Berkeley, Calif.

[21] Appl. No.: 261,229

[22] Filed: Oct. 24, 1988

[51] Int. Cl.⁵ .............................. B01D 53/34
[52] U.S. Cl. ................... 423/235; 423/239; 423/243.01; 423/244.01
[58] Field of Search .............. 423/235, 235 D, 223, 423/210, 239, 239 A, 242 R, 242 A, 244 R, 244 A

[56] References Cited

U.S. PATENT DOCUMENTS 4,482,527 11/1984 Lehr et al. .................. 423/316

FOREIGN PATENT DOCUMENTS

3238424 4/1984 Fed. Rep. of Germany ...... 423/235
97505 6/1984 Japan .................. 423/239

Primary Examiner—Jeffrey E. Russel

[57] ABSTRACT

Exhaust gases are treated to remove NO or $NO_x$ and $SO_2$ by contacting the gases with an aqueous emulsion or suspension of yellow phosphorus preferably in a wet scrubber. The pressure is not critical, and ambient pressures are used. Hot water temperatures are best, but economics suggest about 50° C. are attractive. The amount of yellow phosphorus used will vary with the composition of the exhaust gas, less than 3% for small concentrations of NO, and 10% or higher for concentrations above say 1000 ppm. Similarly, the pH will vary with the composition being treated, and it is adjusted with a suitable alkali. For mixtures of $NO_x$ and $SO_2$, alkalis that are used for flue gas desulfurization are preferred. With this process, 100% of the by-products created are usable, and close to 100% of the NO or NO and $SO_2$ can be removed in an economic fashion.

18 Claims, 7 Drawing Sheets

PROCESS FOR THE REMOVAL OF ACID FORMING GASES FROM EXHAUST GASES

The U. S. Government has rights in this invention pursuant to Contract No. DE-AC03-76SF00098 awarded by the U. S. Department of Energy to the University of California.

BACKGROUND OF THE INVENTION

The present invention relates to an improved process for the removal of acid gases including $NO_x$ from exhaust gases, and particularly to a combined removal of $NO_x$ and $SO_2$ from flue gas and the like. (Flue gas usually contains both NO and $NO_2$; these oxides of nitrogen are collectively given as $NO_x$.)

Concerns about air pollution caused by acid rain are increasing world wide, and considerable research effort is being expended to provide effective treatment of flue gases and other exhaust gases to remove acid forming components therefrom. However, the present methods have disadvantages which are particularly acute with respect to the removal of $NO_x$.

Early methods were primarily used to remove pollutants when the concentrations were very high. As time goes by, and larger volumes of gases are generated, tolerable levels of emissions keep getting lower and lower. At this time emissions may be treated to obtain acceptable levels of $SO_2$ by means of scrubbing processes using aqueous solutions. However, removal of $NO_x$ presents problems, the most serious being sufficient removal and economic considerations. In addition, the economics of using two processes has prompted efforts to utilize wet scrubbing for removal of both $NO_x$ and $SO_2$ in a single process, and some success has been achieved in this direction. Due to the difficulty in solubilizing NO in aqueous solution, these processes have utilized expensive ingredients and often have provided other products requiring disposal.

Wet processes developed for removal of $NO_x$ have been reported. For example, Patent No. P 32 38 424.6 issued by the Federal Republic of Germany Apr. 19, 1984 to Hoechst AG utilizes red phosphorus in inert oxidizing media to remove NO and $NO_2$ from flue gas. However, the patent reports the treatment of very high concentrations of NO, typical concentrations being up in the thousands of parts per million, and in Example 7 of the patent where 1000 parts per million were treated, only 40% was removed. In the two part Example 9, the patentee reports 14,000 parts per million were treated in the first step to obtain a 90% removal to 1,300 parts per million; and in the second part about a 65% removal to about 460 parts per million. Such effluent concentrations are not sufficiently low enough, and we have found that red phosphorus is not satisfactory to treat concentrations of 500 parts per million or less.

Standards recently set in the State of California for emissions from power plants fueled by natural gas is 20 parts per million or less for NO in northern California and 10 parts per million or less in southern California. At this time, federal standards are 75 parts per million or less. Such standards may be attainable using the selective catalytic reduction (SCR) process which is very expensive. Other approaches for the reductions to amounts less than 100 ppm are reported in U.S. Pat. No. 4,079,118 entitled Method for Removing Nitrogen Oxides Using Ferricion-EDTA Complex Solutions issued Mar. 14, 1978, and various other wet processes have been developed to provide efficient removal of $NO_x$. However, these processes generally require either the use of expensive starting materials or create a disposal problem for the products of the processes or both.

Numerous other patents have been issued which disclose wet processes for removal of $NO_x$ such as U.S. Pat. No. 3,984,522; U.S. Pat. No. 4,079,118 and U.S. Pat. No. 4,158,044. In addition, many patents have issued which disclose combined processes for removal of both $SO_2$ and $NO_x$. Examples of such patents include U.S. Pat. Nos. 4,126,529 and 4,347,227. Many other systems have been suggested, and the list is too long to include them all. However, there is much room for improvement in providing a practical, efficient removal process for both of such pollutants either individually or together.

As mentioned above, sulfur oxides can be effectively removed by flue gas desulfurization scrubbers. The majority of these scrubbers now in use involve wet limestone processes, which utilize aqueous slurries of limestone to neutralize the sulfurous and/or sulfuric acids produced from the dissolution and subsequent oxidation of flue gas $SO_2$ in scrubbing liquors. The resulting solid slurries, containing $CaSO_3.1/2H_2O$ and gypsum ($CaSO_4.2H_2O$), can be hauled away for disposal. Such practice is common among power plants located in areas where landfill space is abundant. On the other hand, the more practical solution for power plants situated in densely populated areas is to operate the scrubbers under forced oxidation conditions. Under those circumstances, the major by-product of the scrubbing process is gypsum, which is of some commercial value as a building material.

Further versatility in the processing by flue gas desulfurization scrubbers is obtained by utilizing other alkalis besides limestone or lime. These include soda ash ($Na_2CO_3$), nahcolite ($NaHCO_3$), trona ($Na_2CO_3/NaHCO_3$), $Na_2SO_3$, NaOH, KOH, $K_2CO_3/KHCO_3$, magnesite ($MgCO_3$), dolomite ($CaCO_3/MgCO_3$), $NH_4OH$, and ($NH_4)_2CO_3/NH_4HCO_3$. These materials are more expensive than limestone and are more often used in chemical industries where the volume of waste gas to be treated is small compared to those from power plants, and where the plants are in close proximity to the production sites of those alkalis.

While the wet flue gas desulfurization scrubbers described above are very efficient in the removal of $SO_2$ from flue gas, they are incapable of removing sufficient NO because of its low solubility in aqueous solution. The installation of a separate scrubber for flue gas denitrification generally requires additional capital investment. Accordingly, approaches to modify existing wet flue gas desulfurization processes for the simultaneous removal of $SO_2$ and $NO_x$ emissions have been under world wide investigation.

Several methods have been developed to enhance the absorption of $NO_x$ in scrubbing liquors. These include the oxidation of NO to the more soluble $NO_2$ using oxidants such as $O_3$, $ClO_2$, and $KMnO_4$, as well as the addition of various iron(II) chelates to the scrubbing liquors to bind and activate NO. So far, none of these methods has been demonstrated to be cost-effective, despite high removal efficiencies of both $SO_2$ and $NO_x$.

SUMMARY OF THE INVENTION

It is a primary object of this invention to provide a wet scrubbing process wherein $NO_x$ may be removed from exhaust gases such as flue gas to a degree that the remaining concentrations may be lower than 75 parts per million, and, if desired, lower than 10 to 20 parts per million by volume.

This objective is achieved by a method of treating exhaust gases containing $NO_x$ comprising the step of contacting the exhaust gas with an aqueous emulsion or suspension containing yellow phosphorus. The contact of the exhaust gas may be by any suitable contact method such as in a spray device, but is best carried out in a wet scrubber. At least some oxygen or oxygen source must be present in the exhaust gases, and most exhaust gases contain a sufficient amount; however, air or other sources of oxygen may be added to the exhaust gas when needed or wanted. The pressure is not critical, and the process is generally carried out at ambient or such positive pressures needed to move the gases through a scrubber.

The temperature of the process is operative throughout the liquid range for water, and optimally in the range of about 20° C. to about 95° C., with a preferred range of about 45° to 75° C. The concentration of yellow phosphorus (also known as white phosphorus) required is rather low because any amount is functional, but it should be above about 0.01% in the aqueous emulsion or suspension and best above 0.1%. The high level would be any amount that allows for enough water to carry out the reactions and provide the desired safety conditions, and could be 20% or even higher at the front end of the contacting apparatus. A preferred range would be about 0.1 to 10.0% by weight in order to obtain good results, and optimally from 0.2 to 5% by weight. The pH may also vary over a large range and any pH appears to be operative. However, we consider it best to operate between about 2.0 and 11.0, and best results are obtained at a pH range between about 3.0 and about 9.0.

Another object of the invention is to provide a process wherein both $NO_x$ and $SO_2$ are removed in a single process using an apparatus which is now conventional in $SO_2$ removal processes, and wherein valuable by-products are obtained.

As indicated above, the yellow phosphorus emulsions or suspensions are especially suitable when the pH is adjusted to within the range of about 3.0 to about 9.0, and such adjustment, if needed, may be made by using any suitable alkaline material. When the emulsion is kept alkaline, sulfur oxides are also removed. By using limestone, or one of the alkalis mentioned in the background section above for flue gas desulfurization, the advantages of such processes are obtained along with removal of $NO_x$. The resulting by-products could therefore include phosphate, nitrate, and sulfate salts of calcium, magnesium, sodium, potassium and ammonium. These products are important nutrients for plants and constitute the major components of fertilizers.

A further object of the invention is the provision of a process for removing $NO_x$ and $SO_2$ from flue gas and the like which is capable of taking out substantially all of the $NO_x$ and $SO_2$ from the flue gas, and which also provides suitable by-products from the process.

Further objects and advantages will be apparent as the specification proceeds and the preferred embodiments are described in detail.

DETAILED DESCRIPTION OF THE INVENTION

Certain fuels are already low in sulfur, and other fuels have been treated to remove sulfur prior to combustion. In such cases, sulfur oxide pollution is not a serious problem and generally the exhaust gases are discharged to the atmosphere without treatment. These fuels frequently contain nitrogen compounds that appear in the exhaust gas as $NO_x$. In addition, $NO_x$ may be produced from high temperature decomposition of $N_2$ and $O_2$ in air during the combustion and it is now desired to treat such exhaust gases. For example, power plants using natural gas in California emit exhaust gases with the $NO_x$ concentration greater than 75 parts per million, while the California standards are being set to require emissions of less than 25 parts per million $NO_x$.

We have discovered that $NO_x$ can be removed from flue gas using an aqueous emulsion containing liquid yellow phosphorus. The factors influencing the effectiveness of NO removal of our system include the amount of phosphorus used, the temperature of the aqueous emulsion, the pH of the aqueous emulsion, and the $O_2$ concentration in the flue gas.

The mechanism of NO removal is under investigation, and it is believed that the following chemistry is applicable. It appears that the reaction between yellow phosphorus and $O_2$ can take place in both the aqueous phase and the gas phase. The reaction in the aqueous phase would involve the oxidation of phosphorus by dissolved $O_2$ which takes place on the surface of the phosphorus globules. Therefore, parameters which control the dispersion of molten phosphorus in water such as liquid-to-gas ratio, reactor design, temperature, and additives that change the dielectric constant of the aqueous phase would affect the phosphorus oxidation and hence the NO removal rate. In the gaseous phase, $O_2$ would react with phosphorus vapor evolved from the aqueous emulsion of yellow phosphorus at higher temperatures. Under thermal equilibrium conditions, the partial pressure of $P_4$ is about 365 ppm at 50° C. and about 775 ppm at 60° C. in 1 atmosphere. Therefore, when the partial pressure of NO in the flue gas is about 500 ppm, it may be matched by using a scrubbing (7 liquid at about 55° C. wherein the partial pressure of the $P_4$ is about 550 ppm, assuming equilibrium conditions can be achieved.

As used herein, we express the effectiveness for NO removal of a yellow phosphorus emulsion as the stoichiometric ratio P/NO, which is defined as the number of moles of phosphorus needed to remove one mole of NO averaged over the entire period of an experiment (usually 2 hours). Therefore, the higher the stoichiometric ratio, the more phosphorus is required to remove each mole of NO, the lower the effectiveness for NO removal and vice versa.

The stoichiometric ratio P/NO obtained so far approaches 4, which suggests that one $P_4$ has to be oxidized for each NO removed. The reaction of $O_2$ and $P_4$ results in the production of O and $O_3$ (equations 1 and 2 below). If only one $O_3$ is produced for each $P_4$ oxidized, then a P/NO ratio of 4 implies that most of the NO must have been oxidized to form $NO_2$ before the dissolutions. However, NO may react with $NO_2$ to form $N_2O_3$ (equation 5 below) which is also readily soluble in water (equation 7 below). Therefore two moles of NO can be removed for each NO oxidized to $NO_2$, and consequently the P/NO ratio can be reduced to about 2 under ideal conditions. Given the fact that $P_4$ can react with $O_2$ at a much faster rate than NO does, and that the partial pressure of $O_2$ is substantially higher than that of either O or $O_3$, it is likely that most of the $P_4$ is oxidized by $O_2$, whereas the oxidation of NO to $NO_2$ (equations 3 and 4 below) is effected by O or $O_3$. The $NO_2$ thus produced can either react with another molecule of NO to form $N_2O_3$ (equation 5 below), or to dimerize to form $N_2O_4$ (equation 6 below). Both $N_2O_3$ and $N_2O_4$ are much more soluble in water than NO, and their dissolution in water lead to the formation of nitrous and nitric acids (equations 7 and 8 below). Therefore, the removal of NO by $P_4$ in the gas phase can be summarized by the following equations:

$$P_4 + O_2 \rightarrow P_4O + O \tag{1}$$

$$O + O_2 + M \rightarrow O_3 + M \tag{2}$$

$$NO + O + M \rightarrow NO_2 + M \tag{3}$$

$$NO + O_3 \rightarrow NO_2 + O_2 \tag{4}$$

$$NO + NO_2 + M \rightarrow N_2O_3 + M \tag{5}$$

$$NO_2 + NO_2 + M \rightarrow N_2O_4 + M \tag{6}$$

$$N_2O_3 + H_2O \rightarrow 2HNO_2 \tag{7}$$

$$N_2O_4 + H_2O \rightarrow HNO_2 + HNO_3 \tag{8}$$

where M is another molecule which remains unchanged after the reaction. This proposed mechanism is consistent with the finding that $O_2$ is required for NO absorption reaction and that both nitrite and nitrate were found in the spent liquid materials. The mechanism for the oxidation of phosphorus to various phosphorus oxyacids (equations not shown) appears to be more complicated and is under investigation.

It should be pointed out that the reaction mechanism for NO removal by yellow phosphorus is distinctively different from that using red phosphorus. As mentioned above, the reaction between yellow phosphorus and NO appears to take place in both aqueous and gas phase due to the low melting point (44.1° C.) and high vapor pressure of yellow phosphorus. On the other hand, red phosphorus at atmospheric pressure is solid up to a temperature of about 417° C. (where it sublimes), and therefore has a very low vapor pressure at the reaction temperatures employed herein (about 20° C. to 95° C.). In this case, the absorption of NO is likely to be solid-gas type. Furthermore, the NO-derived products using yellow phosphorus have been determined to include $NO_2-$ and $NO_3-$, both oxidation products of NO, whereas in the case of red phosphorus, it was claimed in the Hoechst AG patent (cited above) that $N_2$, a reduction product of NO, was the only nitrogen product obtained. The difference in NO-derived products in these two cases also suggests different reaction mechanisms are involved.

It was determined that NO removed from simulated flue gas can be recovered as a mixture of nitrite and nitrate, whereas the yellow phosphorus consumed by the NO absorption reaction was converted to a combination of hypophosphite ($H_2PO_2-$), phosphite ($HPO_3=$), and phosphate ($HPO_4=$). We have studied the mass balance of N and P at pH 3 and 60° C., using a 1.5% by weight yellow phosphorus emulsion and a flue gas mixture containing 550 ppm NO and 20% $O_2$. Under such conditions, 100% of the NO was removed during a two hour period. All the NO absorbed was converted to $NO_2-$, and $NO_3-$ in an about 1:7 ratio. In the case of the phosphorus mass balance, we found that 90% of the phosphorus consumed or unaccounted for can be recovered as a mixture of $H_2PO_2-$, $HPO_3=$, and $HPO_4=$ in an about 1:10:40 ratio. The less than quantitative recovery of phosphorus is attributed to the difficulty in collecting all of the phosphorus globules remaining in the scrubber after the experiment. From these data, it is seen that the removal of NO by yellow phosphorus results in the production of predominently nitrate and phosphate, both of which are useful in the manufacture of fertilizer.

As indicated above, the present invention also provides a method of removing both $NO_x$ and $SO_2$ in a single process. We have found that yellow phosphorus does not react with $HSO_3-$ to any appreciable extent under the reaction conditions just discussed. However, simultaneous removal may be effected by the inclusion of an alkaline component such as limestone along with the aqueous emulsion of yellow phosphorus. For instance, when an emulsion containing 3.3% by weight yellow phosphorus and 5.0% by weight $CaCO_3$ slurry at 55° C. and pH 7.5 was used as a scrubbing liquor, and a 5.05 $CaCO_3$ slurry was used in an absorber; a simulated flue gas treated over a three hour period had about 95% of the 560 ppm NO and about 100% of the 2900 ppm $SO_2$ in the flue gas removed.

As indicated above, removal of $NO_x$ with yellow phosphorus provides nitrites and nitrates in acid form as shown in equations (7) and (8) above. However, when an alkali is added to the emulsion, these acids are converted to salts. In addition, when $SO_2$ is present, additional chemistry takes place. As illustrated in equation (9) below, the $SO_2$ converts some $NO_x$ to ammonia.

$$NO + NO_2 + 3H_2O + 6HSO_3- \rightarrow 2NH_4+ + 6SO_4= + 4H^+ \tag{9}$$

The $HSO_3-$ comes from the $SO_2$ as follows:

$$6SO_2 + 6H_2O \rightarrow 6H_2SO_3$$

$$6H_2SO_3 \rightarrow 6H^+ + 6HSO_3-$$

Putting the reactions together, the $NO_x$ and $SO_2$ may be written as given in equation (10) as follows:

$$NO+NO_2+6SO_2+9H_2O \rightarrow 2NH_4^+ + 6SO_4^= +10H+ \tag{10}$$

The $NO+NO_2$ for equation (10) is obtained from the yellow phosphorus and NO as follows:

$$P_4+11/2O_2+2NO+6H_2O \rightarrow NO+NO_2+4H_2PO_4^- +4H+ \tag{11}$$

The alkali takes up the H+ from equation (10) and (11) to drive the system and provide by-products in the form of salts.

For example, when $CaCO_3$ is used as the alkali, the 10 OH− required to neutralize the 10 H+ from equation (10) above are provided as follows:

$$5CaCO_3+5H_2O \rightarrow 5Ca(OH)_2+5CO_2$$

$$5Ca(OH)_2 \rightarrow 5Ca^{++}+10OH^-$$

Under these conditions equation (12) replaces equation (10).

$$NO+NO_2+6SO_2+5CaCO_3+4H_2O \rightarrow 2NH_4^+ + 6SO_4^= +5Ca^{++}+5CO_2 \tag{12}$$

The $CO_2$ formed will join the flue gas in the scrubber, and the Ca ions will combine with sulfate ions to form insoluble $CaSO_4$. The resulting product in the scrubber is then ammonium sulfate which is useful as a fertilizer. Similarly, $CaCO_3$ will take up the H+ from equation 11 and form various calcium phosphates such as $CaHPO_4$. Thus the overall equation for the reaction with yellow phosphorus and limestone is as follows:

$$P_411/2O_2+2NO+6SO_2+9CaCO_3+24H_2O \rightarrow (NH_4)_2HPO_4+6CaSO_4 \cdot 2H_2O+3CaHPO_y \cdot 2H_2O+9CO_2 \tag{13}$$

In this way all of the products from the flue gas treatment process of this invention are disposable materials, and most of the materials are valuable by-products.

As mentioned above, various alkalis may be used. However, different alkalis provide somewhat different products. Where limestone and dolomite are used, insoluble sulfates of calcium and magnesium are produced. When any of the sodium carbonates such as trona are used, soluble sodium sulfate is produced, and when potassium-based alkalis are used, potassium sulfate (another fertilizer) is produced. All of these products and the phosphates produced from the yellow phosphorus have commercial value. Accordingly, different starting materials may be used to provide different products that may be tailored to fit changing market conditions and provide the most needed materials while at the same time solving the acid rain problem.

For example, when it is desired to provide nitrogen containing fertilizer, ammonia may be used as the alkali material. The equations relevant to the ammonia system are as follows:

$$NO+NO_2+6SO_2+9H_2O \rightarrow 2NH_4^+ + 6SO_4^= +10H+ \tag{14}$$

In order to neutralize the 10 H+, 10 moles of $NH_3$ are needed, and the reaction becomes the following:

$$NO+NO_2+6SO_2+9H_2O+10NH_3 \rightarrow 12NH_4^+ + 6SO_4^= \tag{15}$$

The yellow phosphorus is required to induce the oxidation of NO to $NO_2$ and the reaction is as follows:

$$P_4+11/2O_2+2NO+6H_2O \rightarrow NO+NO_2+4H_2PO_4^- +4H^- \tag{16}$$

Thus the overall reaction with yellow phosphorus and ammonia is as follows:

$$P_4+11/2O_2+2NO+6SO_2+14NH_4OH + H_2O \rightarrow 4(NH_4)H_2PO_4+6(NH_4)_2SO_4 \tag{17}$$

It will be appreciated that the reactions show that a ratio of $SO_2$ to NO of 3:1 will provide reduction of all of the NO to ammonia. An excess of NO will result in a certain amount of nitrites and nitrates, and an excess of $SO_2$ would require additional alkali, preferably one that would form some insoluble sulfate to assure removal of all of the $SO_2$.

From the discussion of the chemistry of the alkalis given, it may be inferred how the other suggested alkalis may function. It will also be appreciated that the list of alkalis given in the background section and used for wet desulfurization are not only all operative, but also are not inclusive of all possible useful alkalis.

The invention is illustrated further by the following examples which are not to be construed as limiting the scope of the invention.

EXAMPLE 1

The removal of NO from flue gas by yellow phosphorus in water was studied using a bench scale scrubber. The scrubber was an upright cylindrical Pyrex column (50mm i.d. ×210mm) with a fritted disc bottom capable of holding a head of aqueous liquid. The scrubber was equipped with a thermometer for measuring the temperature of liquid therein and a pH electrode for measuring the pH of the liquid therein. A water jacket was provided to heat or cool the contents of the scrubber, and appropriate feed lines to admit measured amounts of gases for the simulated flue gas are provided. With this set-up accurate amounts of NO, $N_2$, $O_2$ and $SO_2$ are provided to the scrubber. The downstream side of the scrubber is equipped with appropriate condensers, an absorber, cold trap and analyzers for $NO_x$ and $SO_2$.

1.0 gram of yellow phosphorus (m.p.=44.1° C.) was melted in 0.2 liters of water at 60° C. in the scrubber. The pH of the aqueous phase was between 3 and 4. Yellow phosphorus globules were dispersed in water upon the bubbling of a gaseous mixture containing ~500 ppm NO, from 0 to 20% $O_2$, and the balance $N_2$ through the bottom of the column at a flow rate of 0.8-1.0 liter per minute. In addition to these runs wherein the amount of $O_2$ was varied, other runs were made wherein the amount of phosphorus was varied, the temperature of the aqueous emulsion was varied, and in which the pH of the aqueous emulsion was varied.

The gas mixture leaving the reaction column was passed through a condenser (length =390mm), a gas washing bottle containing 0.2 liters of a 0.2 M NaOH solution, a second condenser (length =200 mm), and then a cold trap (−84° C.). The NO and $NO_2$ concentrations in the outlet gas was measured by a Thermoelectron Model 14A chemiluminescent $NO_x$ analyzer. The reaction was stopped after 2 hours, and the unused yellow phosphorus was collected upon cooling of the emulsion to room temperature and was weighed to determine the amount of phosphorus consumed.

The amount of NO absorbed was determined from the NO concentration in the flue gas, the flue gas flow rate, the reaction time, and the percentage of NO removed during that period. The pH of the scrubbing liquor and the NaOH absorber solution after the experiments were generally about 1.5 and 12.5, respectively. The NO and phosphorus derived products in the spent solution in the scrubber as well as the NaOH absorber were determined by ion chromatography.

The passage of the simulated flue gas mixture through the scrubbing column containing the molten phosphorus creates a fine yellow phosphorus dispersion in water. When $O_2$ is present in the flue gas, a dense white fume is produced which could lead to a significant response from the chemiluminescent $NO_x$ analyzer if left unchecked. This is believed to result from the chemiluminescence produced by incomplete oxidation of phosphorus. This interference decreased substantially when the partial pressure of $O_2$ in the flue gas is increased, consistent with the complete oxidation of phosphorus under those conditions.

The use of a NaOH absorber and a cold trap coupled with the monitoring of the scrubbed flue gas using the $NO_x$ mode on the chemiluminescent analyzer (which involves passage of the gas mixture through a stainless steel column at 650° C. half of the time) seem to eliminate such interference. In industrial applications where the scrubbing liquor is recycled, the capture of $NO_2$ (produced from the oxidation of NO) and phosphorus oxide vapor would be much more efficient than our laboratory scrubbing column, and the use of an absorber downstream would be unnecessary. In a group of experiments carried out according to this example, we found that the stoichiometric ratio P/NO is affected by the amount of phosphorus used, the temperature of the aqueous emulsion, the pH of the aqueous emulsion, and the $O_2$ and NO concentrations in the flue gas.

Figure 1:
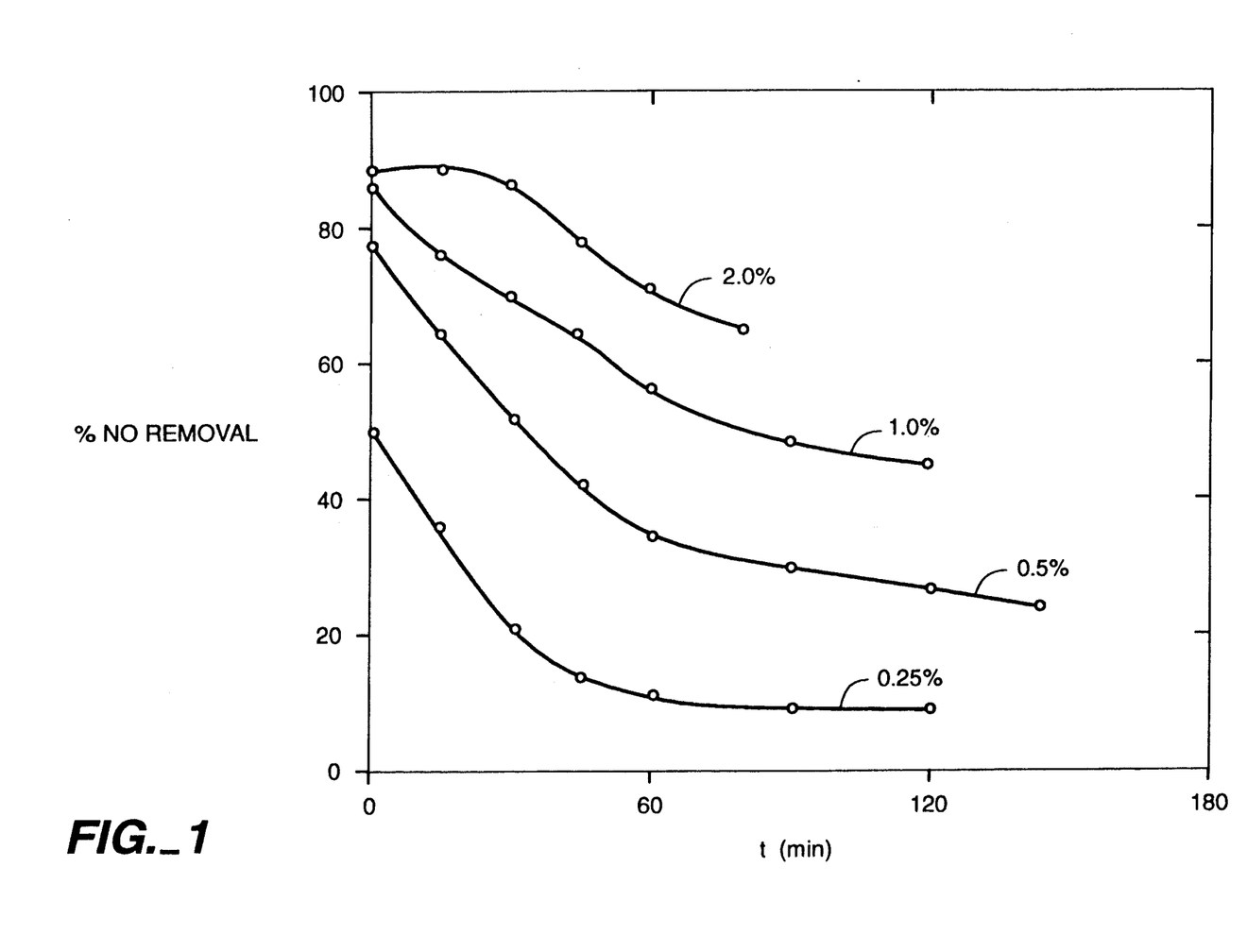
FIG. 1 illustrates data in graphical form obtained from a group of experiments wherein NO is removed from a simulated flue gas using different amounts of yellow phosphorus.
Figure 1A:
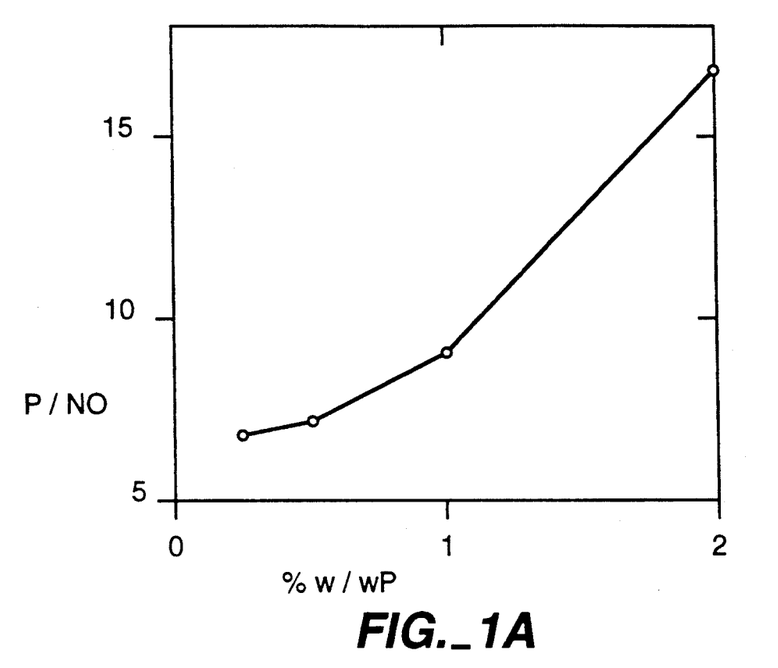

The reaction was carried out using various amounts of phosphorus in the emulsion (at pH 3), and with an $O_2$ concentration of 4% in the simulated flue gas. The results of these runs are shown graphically in FIG. 1. It is clear that the initial NO removal efficiencies were higher at higher concentrations of phosphorus and reaches about 90% at 2.0% by weight yellow phosphorus. However, the stoichiometric ratio P/NO appears to be higher at higher phosphorus concentrations, indicating lower overall NO removal effectiveness under those conditions.

Figure 2:
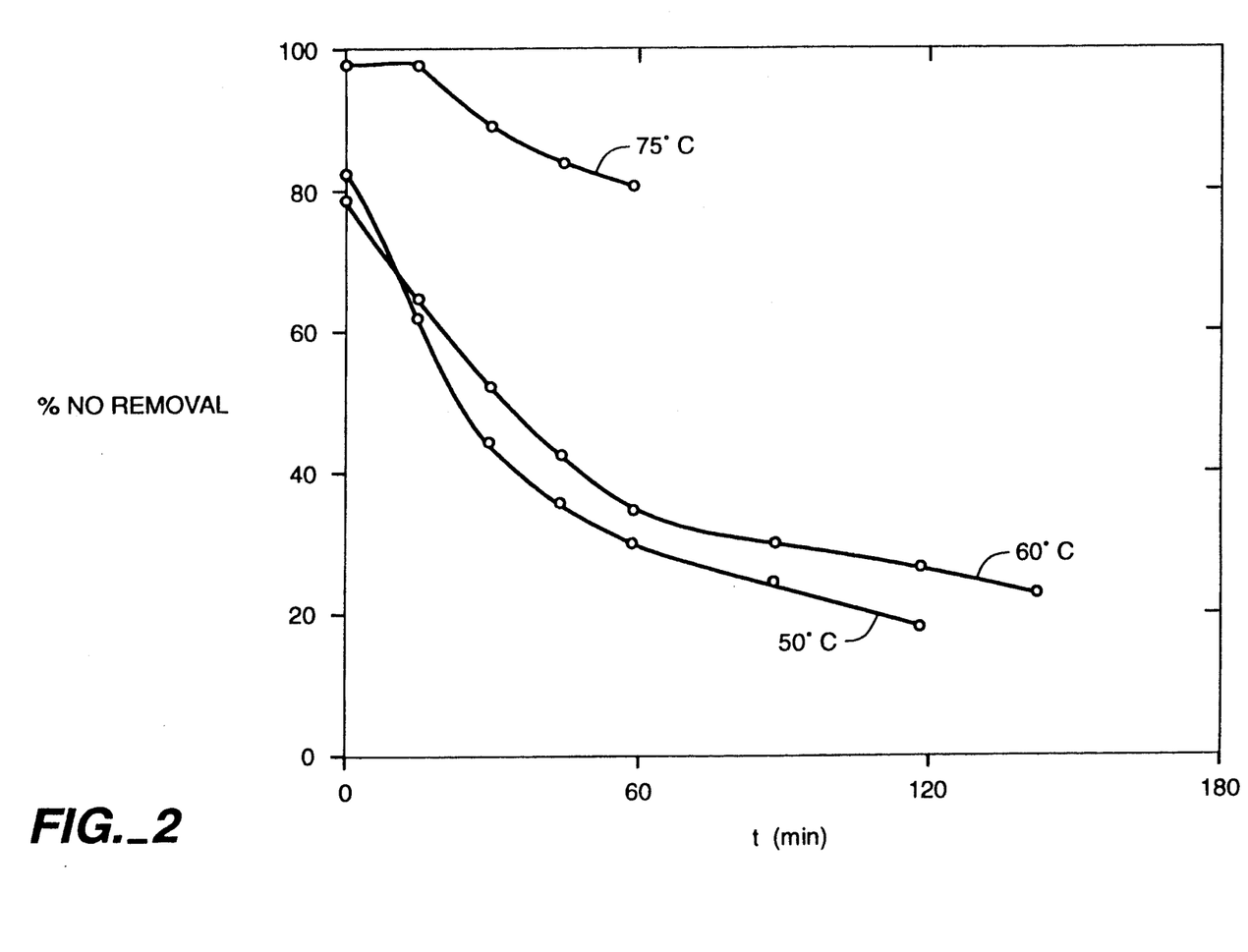
FIG. 2 shows data in graphical form obtained from a group of experiments wherein NO is removed from a simulated flue gas using yellow phosphorus emulsions at various temperatures.
Figure 2A:
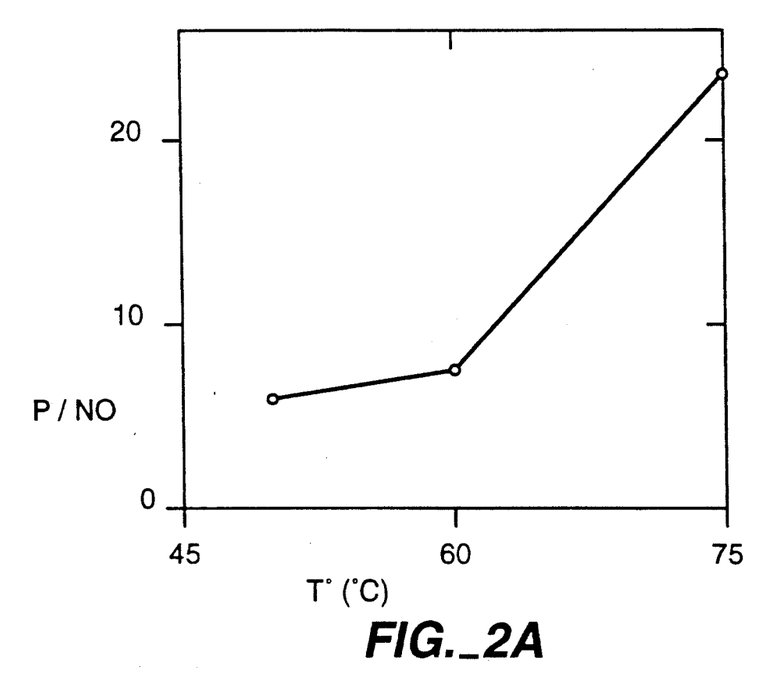

The effect of the temperature of the emulsion was determined in a number of experiments, and the results are shown in FIG. 2. In these runs, the emulsion contained 0.5% yellow phosphorus at pH 3 and the flue gas contained 550 ppm NO, 4.0% $O_2$, and the remainder $N_2$. Whereas the initial NO removal efficiencies were higher at higher temperatures, the overall effectiveness for NO removal were lowered under these conditions. For instance, the initial removal percentage of NO was increased from 78% to 99% when the temperature of the emulsion was raised from 50° C. to 75° C. At the same time, the P/NO ratio increased from 7.1 to 24.5, representing a large decrease in removal effectiveness.

Figure 3:
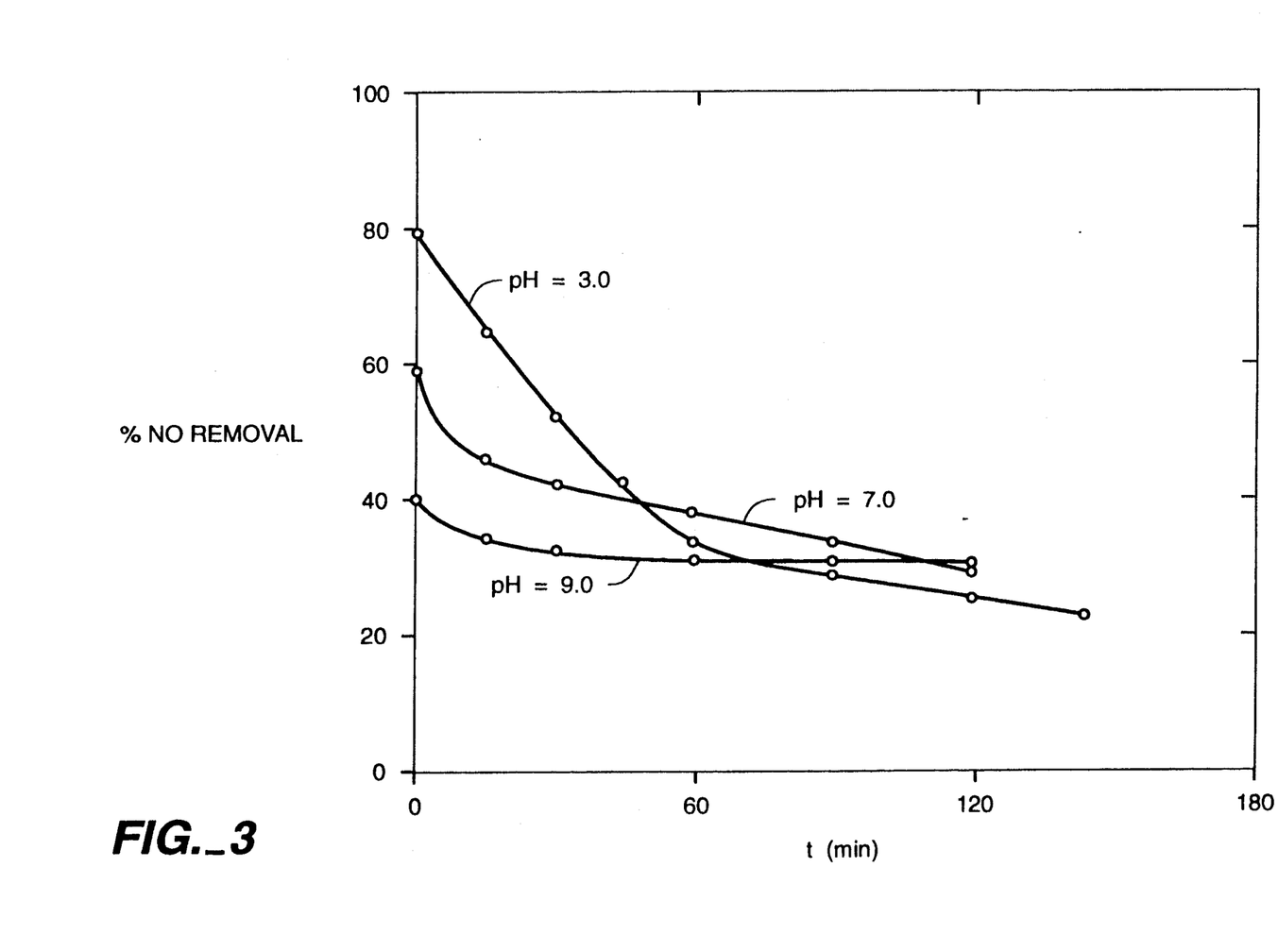
FIG. 3 shows data in graphical form obtained from a group of experiments wherein NO is removed from a simulated flue gas using an aqueous emulsion of yellow phosphorus at various pH conditions.
Figure 3A:
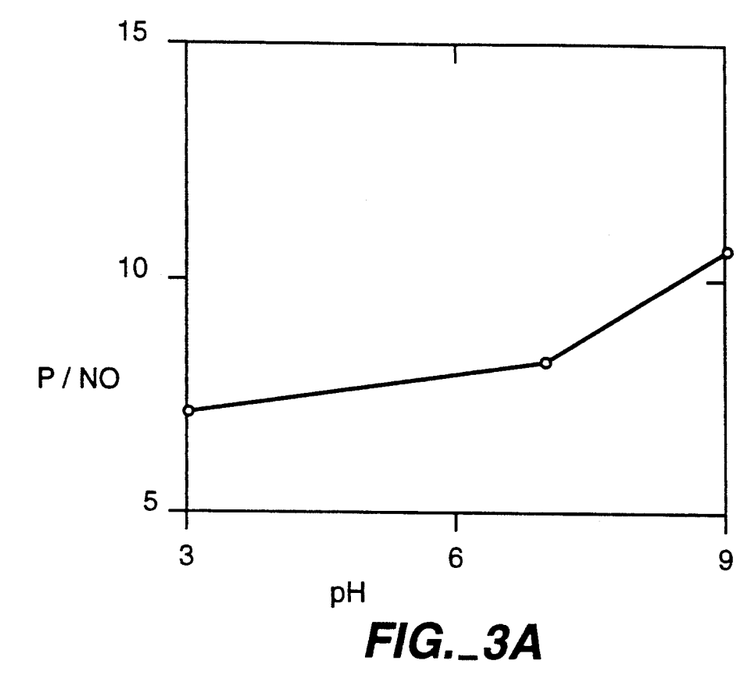

The influence of pH on the effectiveness for NO removal of a yellow phosphorus emulsion has been determined, and the results of the experiments are shown in FIG. 3. In these runs, the $O_2$ content was adjusted to 4% by volume. As shown in FIG. 3, the effectiveness for NO removal increases with increasing acidity of the aqueous phase over the pH range of 3.0 to 9.0. Specifically the P/NO ratio decreased from 10.5 to 7.1 when the pH was lowered from 9.0 to 3.0.

Figure 4:
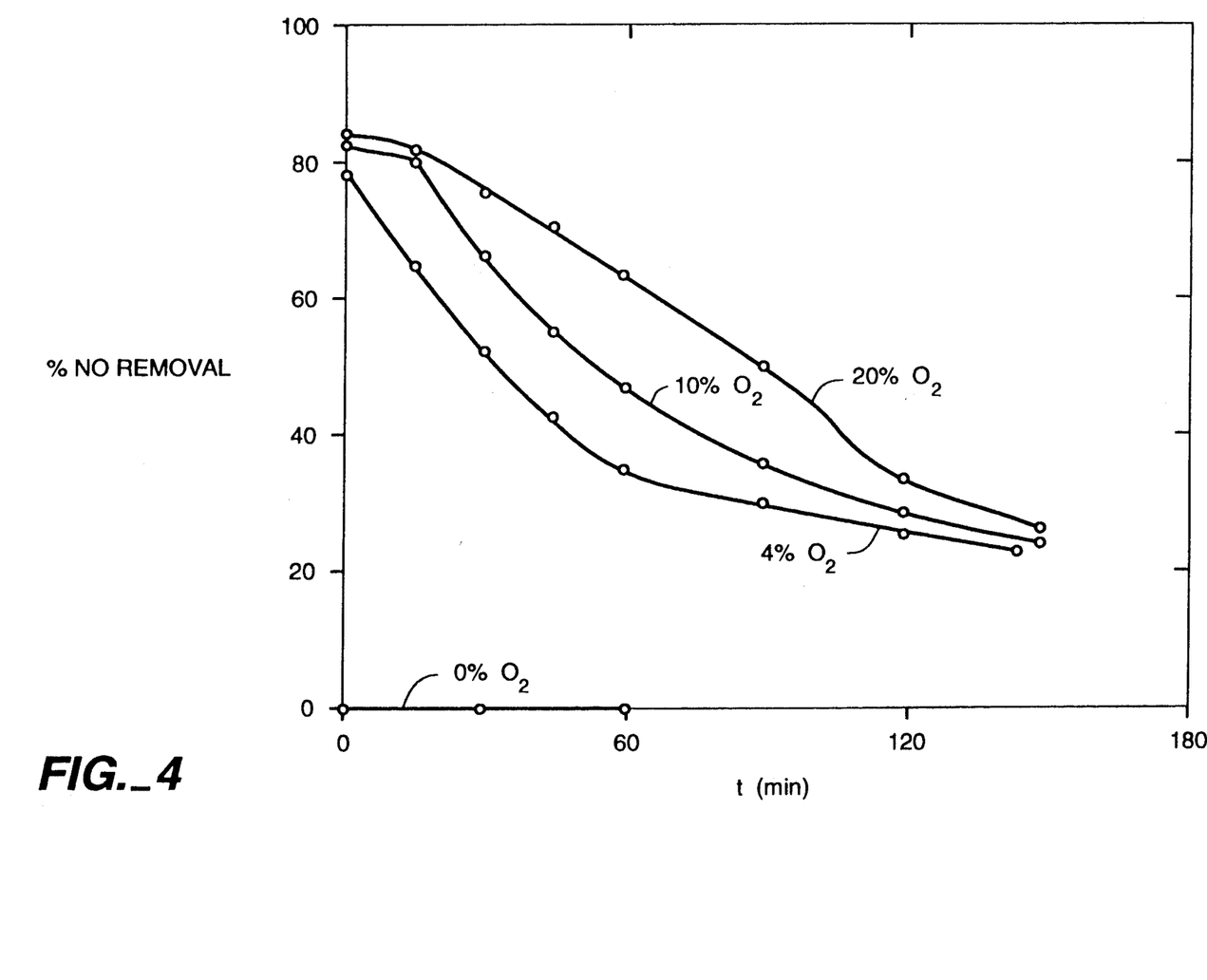
FIG. 4 shows data in graphical form obtained from a group of experiments wherein NO is removed from a simulated flue gas using yellow phosphorus and wherein the amount of oxygen in the flue gas is varied.
Figure 4A:
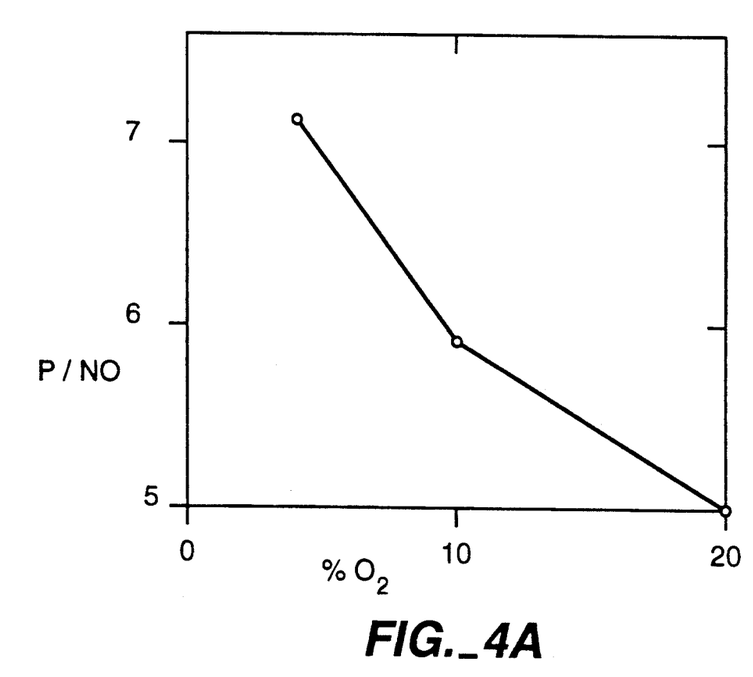

The influence of $O_2$ concentration in the flue gas was also determined, and the data shown in FIG. 4. As there shown, the presence of $O_2$ is essential for the removal of NO by yellow phosphorus emulsions. In addition, the effectiveness for NO removal of a phosphorus emulsion increases as the $O_2$ content of the simulated flue gas mixture increases. In these runs, the NO absorption reaction was carried out at pH 3 and 60° C. using a 0.5% by weight yellow phosphorus emulsion. It was found that the P/NO ratio decreased from 7.1 to 5.0 when the $O_2$ content was increased from 4% to 20%. Therefore, the use of yellow phosphorus for the removal of flue gas works best under forced oxidation conditions.

EXAMPLE 2

(Comparison Example)

A comparison of the NO removal effectiveness of yellow phosphorus and red phosphorus was made for use in treating simulated flue gases having 500 ppm NO using the apparatus of Example 1. Both emulsions of 0.5% by weight yellow phosphorus and suspensions of 1.5% by weight red phosphorus were used to treat a simulated flue gas of 500 ppm NO and 4% $O_2$ at 60° C. The yellow phosphorus emulsion removed up to 80% of the NO whereas none of the red phosphorus emulsions removed any detectable amount. At pH 9, the yellow phosphorus emulsion removed up to 40% of the NO whereas the red phosphorus still did not remove a detectable amount. At pH 10.1, the red phosphorus did remove some NO but the effectiveness was still very low (P/NO about 1,000).

EXAMPLE 3

Spray drying experiments were carried out using a Niro Atomizer portable spray dryer equipped with a Type M-02/a centrifugal atomizer. The volume of the spray drying chamber was about 350 liters, and the gas flow capacity was about 500 liters per minute. Yellow phosphorus was introduced to the spray dryer chamber either in liquid form (as an emulsion in water) or in solid particulate form (as a fine particulate dispersion in water prepared by the rapid cooling of a phosphorus in water emulsion from about 80° C. to room temperature). The inlet temperature of the simulated flue gas mixture (containing 490 ppm NO, 20% $O_2$, and the balance $N_2$) was 170° C. and the exit gas temperature was 65° C. Using a 0.25% by weight yellow phosphorus emulsion up to 40% of the NO was removed. In a separate experiment, fine particulate dispersions of yellow phosphorus (5% by weight) also containing 3.2 M urea were used in the spray drying system. The simulated flue gas contained about 550 ppm NO, and up to about 70% of the NO was removed. It is expected that higher removals may be achieved using a more concentrated phosphorus emulsion and/or under better operating conditions.

EXAMPLE 4

In this example, various levels of NO in the simulated flue gas was treated using the apparatus of Example 1. The 150 cc aqueous emulsion contained 1.0 gram of $CaCO_3$ in all cases except Example 4f, where a pH 4.3 acetate buffer was used. The simulated flue gas contained 11–12% O₂, and the total gas flow rates were 0.8–1.0 liter per minute. Total experimental time ranged between 2 and 3 hours. Other operating conditions used, and the results obtained, are given in the Table below.

TABLE

| Example | NO (ppm) | Temp. (°C.) | Initial pH | Phosphorus added (gm) | Maximum % Removal | Average % Removal |
|---|---|---|---|---|---|---|
| 4a | 60 | 50 | 6.5 | 1.5 | 100 | 100 |
| 4b | 65 | 50 | 6.3 | 0.8 | 100 | 100 |
| 4c | 400 | 50 | 6.2 | 0.8 | 80 | 43 |
| 4d | 430 | 50 | 7.4 | 1.5 | 100 | 76 |
| 4e | 1950 | 50 | 6.2 | 3.1 | 55 | 29 |
| 4f | 2000 | 75 | 4.3 | 4.0 | 95 | 72 |

From these examples, it is seen that very efficient removal is achieved at 50° C. when low concentrations of NO are to be removed. In the examples given, satisfactory removal of higher concentrations of NO is achieved at 75° C.

EXAMPLE 5

Figure 5:
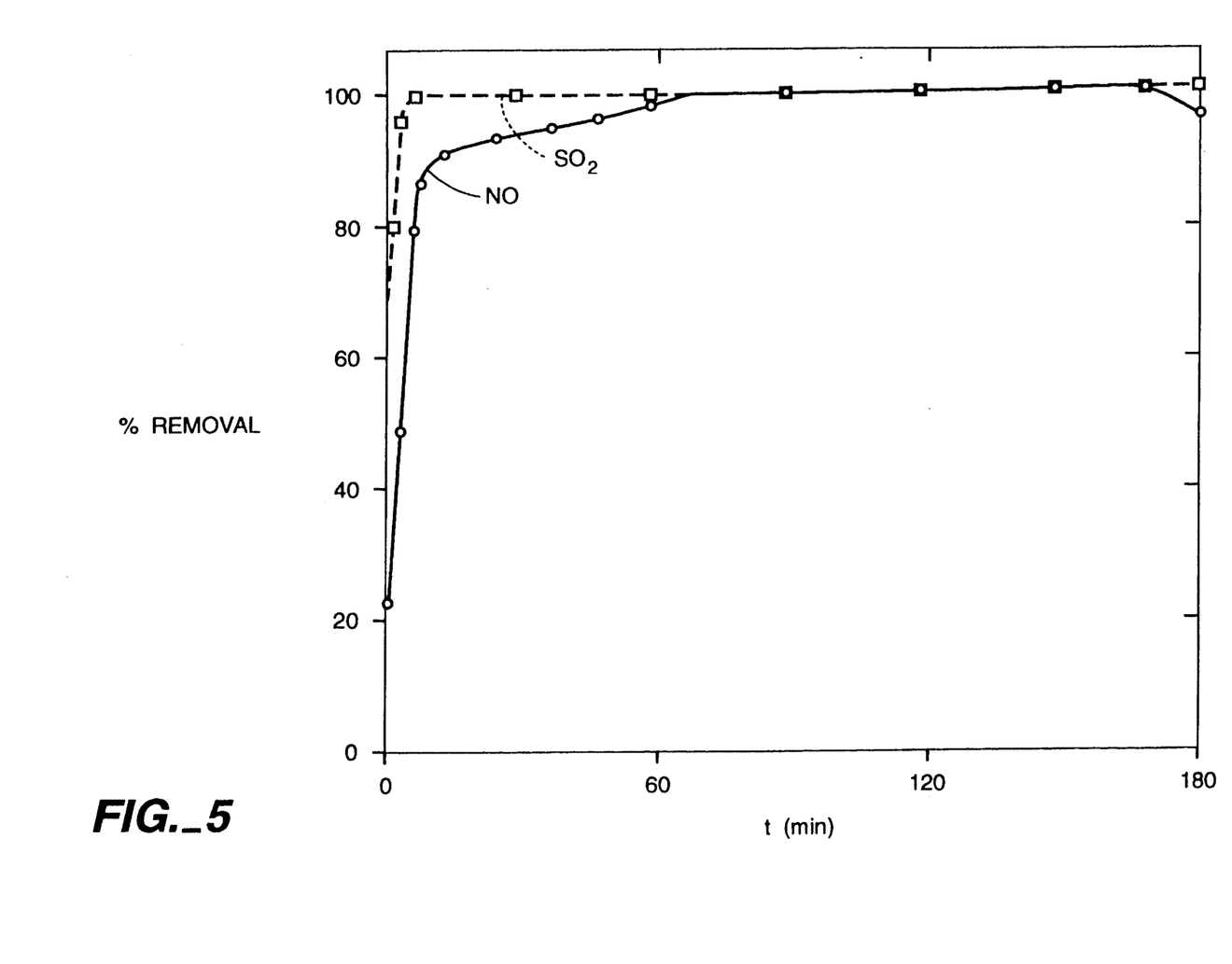
FIG. 5 shows data in graphical form obtained from an experiment wherein both NO and $SO_2$ are removed from a simulated flue gas using a mixture of an aqueous emulsion of yellow phosphorus and a slurry of limestone.

The simultaneous removal of NO and SO₂ from a simulated flue gas was carried out using a yellow phosphorus emulsion mixed with a slurry of limestone. The apparatus used in this experiment is similar to that of Example 1, except that the reactor had a volume of about 1.2 liter(110mm i.d. ×130mm). 0.9 liters of an aqueous emulsion/slurry containing 3.3% by weight of yellow phosphorus and 5.0% by weight of CaCO₃ was dispersed by a magnetic stir bar. The temperature of the scrubbing liquor was kept at 55° C. and the pH was 7.5. The absorber was provided with a 5.0% by weight slurry of CaCO₃. A simulated flue gas mixture containing 560 ppm NO, 2900 ppm SO₂, 10% O₂, and the balance N₂ was bubbled into the slurry at a rate of about 1.3 liters per minute. The reaction temperature was maintained at 55° C., whereas the pH of the slurry dropped from about 7.5 to about 4.2 after 3 hours. The removal rates of NO and SO₂ are shown in FIG. 5 wherein it is seen that the removal of SO₂ quickly reaches about 100% and shortly thereafter the removal rate of NO reaches about 100%. From these data, it appears that NO removal by the use of yellow phosphorus is enhanced when SO₂ and limestone are present.

The solid and liquid phases in the scrubber and in the absorber were separated by suction filtration and analyzed. The solid collected from the scrubber after the reaction was analyzed by laser Raman spectroscopy; and was shown to contain CaSO₄·2H₂O, in addition to unreacted CaCO₃ and yellow phosphorus. In the absorber downstream, only unreacted CaCO₃ was detected. No CaSO₃ 1/2·1/2H₂O precipitate was detected in either the scrubber or the absorber.

It was found that both the scrubbing liquor and the absorbing solution contain NO₂−, NO₃−, SO₃=, SO₄=, H₂PO₂−, HPO₃=, and HPO₄=. Since the amount of NO₂− and NO₃− recovered could account for only about 50% of the NO absorbed and a substantial amount of HSO₃− was present in the scrubbing liquor, a search for nitrogen-sulfur compounds was conducted. Indeed, we found that about 40% of the NO absorbed could be accounted for by the formation of the nitrogen-sulfur compounds hydrozylamine disulfonate (HADS) and amine disulfonate (ADS) in a slightly acidic (pH about 4) scrubbing liquor. We also found that both HADS and ADS were subsequently hydrolyzed to NH₄+ in the scrubbing liquor when the pH was lowered to about 2. The formation of nitrogen-sulfur compounds via the reaction of NO₂− and HSO₃− in scrubbing liquor and their hydrolysis reactions have been well studied, and the NH₄+ formation follows from these studies. Therefore the use of yellow phosphorus emulsions for combined NO$_x$ and SO₂ removal results in the conversion of undesirable NO to NH₄+, NO₃−, and NO₂−, all of which are desirable chemicals for the manufacture of fertilizer.

While only illustrative embodiments have been described, it will be appreciated that various modifications may be made, and the invention is to be limited only by the spirit and scope of the appended claims.

What is claimed is:

1. A method of treating exhaust gases containing acid forming pollutants including nitrogen oxides, which comprises the step of contacting the exhaust gas with an aqueous emulsion or suspension of yellow phosphorus.

2. The method of treating exhaust gases as defined in claim 1, wherein the temperature of the aqueous emulsion or suspension is from about 20° C. to about 95° C.

3. The method of treating exhaust gases as defined in claim 1, wherein the temperature of the aqueous emulsion is from about 45° C. to about 75° C.

4. The method of treating exhaust gases as defined in claim 1, wherein the amount of yellow phosphorus in the emulsion is from about 0.01 to about 20.0% by weight.

5. The method of treating exhaust gases as defined in claim 1, wherein the amount of yellow phosphorus in the emulsion is from about 0.1 to about 10.0% by weight.

6. The method of treating exhaust gases as defined in claim 1, wherein an alkaline material is added to the emulsion to retain the pH between about 2 and about 11.

7. The method of treating exhaust gases as defined in claim 1, wherein the pH is adjusted between about 3 and about 9.

8. The method of treating exhaust gases as defined in claim 1, wherein the amount of oxygen in the flue gas being treated is between about 1% and about 16% by volume.

9. The method of treating exhaust gases as defined in claim 8, wherein the oxygen content is adjusted by adding air to the exhaust gas.

10. A method of treating exhaust gases containing NO$_x$ and SO₂, which comprises the steps of contacting the exhaust gases with an aqueous emulsion or suspension of yellow phosphorus and an amount of alkali sufficient to provide and retain a pH within the aqueous emulsion or suspension between about 3 and 9.

11. The method of treating exhaust gases as defined in claim 10, wherein the aqueous emulsion or suspension is maintained at a temperature of about 45° C. to about 75° C.

12. The method of treating exhaust gases as defined in claim 11, wherein the alkali comprises calcium carbonate.

13. The method of treating exhaust gases as defined in claim 11, wherein the alkali comprises ammonia.

14. A method of treating exhaust gases containing from about 25 to about 3000 parts per million $NO_x$, which comprises the steps of providing an aqueous emulsion of yellow phosphorus wherein the amount of phosphorus is from about 0.1 to about 10.0% by weight, and the temperature of the emulsion is between about 45° C. and about 90° C., and contacting the gas with the emulsion for a time sufficient to reduce the concentration of NO in the exhaust gas to less than about 25 parts per million.

15. The method as defined in claim 14, wherein the exhaust gas also contains from about 100 to about 3,000 parts per million sulfur dioxide.

16. The method as defined in claim 15, wherein the aqueous emulsion also contains an alkali.

17. The method as defined in claim 14, wherein the aqueous emulsion also contains calcium carbonate.

18. A method of treating exhaust gases containing from about 25 to about 1000 parts per million NO, which comprises the steps of providing an aqueous emulsion of yellow phosphorus wherein the amount of phosphorus is from about 0.1 to about 5.0% by weight, and the temperature of the emulsion is from about 45° C. to about 75° C., and passing the gas through the emulsion in direct contact therewith with the contact time being sufficient to reduce the concentration of $NO_x$ in the exhaust gas to less than about 20 parts per million.

* * * * *